United States Patent [19]
Bell et al.

[11] Patent Number: 5,951,650
[45] Date of Patent: Sep. 14, 1999

[54] SESSION TRAFFIC SPLITTING USING VIRTUAL INTERNET PROTOCOL ADDRESSES ASSOCIATED WITH DISTINCT CATEGORIES OF APPLICATION PROGRAMS IRRESPECTIVE OF DESTINATION IP ADDRESS

[75] Inventors: Jon Anthony Bell, Raleigh; Edward Glen Britton, Chapell Hill, both of N.C.

[73] Assignee: International Business Machines Corporation, Armonk, N.Y.

[21] Appl. No.: 08/792,607

[22] Filed: Jan. 31, 1997

[51] Int. Cl.$^6$ ........................................ G06F 13/00
[52] U.S. Cl. ............................ 709/238; 709/240
[58] Field of Search ............................ 359/136, 172; 345/502; 709/238, 240

[56] References Cited

U.S. PATENT DOCUMENTS

| | | | |
|---|---|---|---|
| 4,731,784 | 3/1988 | Keller et al. ............................ | 359/136 |
| 5,091,849 | 2/1992 | Davis et al. ............................ | 345/502 |
| 5,321,542 | 6/1994 | Freitas et al. ........................... | 359/172 |
| 5,490,252 | 2/1996 | Macera et al. ...................... | 395/200.79 |

Primary Examiner—Le Hien Luu
Attorney, Agent, or Firm—Jeanine S. Ray-Yarletts

[57] ABSTRACT

The present invention utilizes Virtual Internet Protocol Addressing (VIPA) to enable a host computer to efficiently route TCP/IP traffic across multiple physical links. This is accomplished by associating different applications or application sets with different virtual IP addresses. The virtual IP addresses may be associated with different physical adapters. Since many applications send similar data repeatedly, categorizing application sets and associating them with different physical adapters allows high volume applications to be associated with one adapter while lower volume, interactive data is associated with another adapter.

7 Claims, 5 Drawing Sheets

201

RIP advertises routes to VMPA_M
via Link_1 and via Link_2

202

Routes propagate through the IP network such that
Client_X sends traffic to VIPA_M via Link_1 &
Client_Y sends traffic to VIPA_M via Link_2.

203

Datagrams from FTP and TELNET in MVS_M for
Client_X enter OutQueue1

204

Datagrams from FTP and TELNET in MVS_M for
Client_Y enter OutQueue2

205

TELNET datagrams in each output queue wait for
transmission of FTP datagrams that are ahead of
them in the same output queue.

FIG. 2

SESSION TRAFFIC SPLITTING USING VIRTUAL INTERNET PROTOCOL ADDRESSES ASSOCIATED WITH DISTINCT CATEGORIES OF APPLICATION PROGRAMS IRRESPECTIVE OF DESTINATION IP ADDRESS

BACKGROUND OF THE INVENTION

TCP/IP (Transmission Control Protocol/Internet Protocol) is the transport mechanism underlying the Internet. It is also the underlying protocol for many intranets and business applications in existence today. TCP/IP was started as an educational and scientific network. It was not designed to handle high-volume traffic associated with a mixture of applications that have different service level requirements. Because of this design point, there were few effective measures incorporated into TCP/IP to handle applications with conflicting service level requirements.

Through the growth of the Internet, which includes the world wide web, requirements have arisen for better control of service levels for host TCP/IP networks. This has become especially true where the TCP/IP host controls business applications or transactions. The design of TCP/IP is such that each physical network interface adapter has associated with it an address. This is unique within the entire network and is the method by which all other devices communicate with the adapter or the devices connected through the adapter. If a given TCP/IP host has multiple interface adapters, the user communicating with the host must select an interface adapter which they chose to use. The user must then reference the host by the address of the particular adapter which the user has chosen to use. After the routing protocols have converged all the routing tables contained within hosts and routers throughout the network, they all will agree on one route for datagrams from one address on one host to one address on another host.

The above method works well when all applications executing on a given host at one time require the same level of service, or when the interface adapters are not highly utilized, or when the host has only one network interface adapter. However, in many cases a large host system simultaneously executes multiple applications with different service level requirements, has more than one interface adapter available, and highly utilizes some of those interface adapters. For example, when a file transfer protocol (FTP) server is transmitting enough traffic to almost fully utilize some network interface adapters on a host, TELNET (interactive) connections to that server that use those same highly utilized links may suffer from unacceptable interactive response time, because TELNET traffic may have to wait for the transmission across the network interface adapters of the much more voluminous FTP traffic.

Two methods have been proposed for dealing with different service level requirements in a TCP/IP host. First, the Internet Protocol header includes a field with which the host can indicate the type of service requested for the datagram associated with this header. If the Minimum Delay bit in that field is turned on, then all hosts and routers transmitting the datagram should try to transmit it with minimum delay. If the Maximum Throughput bit in that field is turned on, then all hosts and routers should try to transmit it via the highest bandwidth path available. (The header of an IP datagram should not have both the Minimum Delay and the Maximum Throughput bits turned on.) For example, if a host has two links, one a low-bandwidth terrestrial link and the other a high-bandwidth satellite link, the administrator may prefer for high-bandwidth FTP traffic to use the high-bandwidth satellite link despite its inherent delay, and for low-bandwidth but interactive TELNET traffic to use the inherently lower-delay terrestrial link. However, since very few hosts or routers consider the settings of these bits when making routing decisions, turning on either of these bits is not usually an effective procedure. For additional information on the minimum delay bit and the maximum throughput bit see RFC 791, "Internet Protocol".

The second method for addressing the problem is for some hosts have one output queue for datagrams from interactive applications, such as TELNET and rlogin, and another output queue for datagrams from all other applications, including FTP, and have the network interface layer assign datagrams to queues according to the datagram's TCP port number. In some cases, these hosts send out all the datagrams from the interactive queue before sending out any from the non-interactive queue. However, by forcing the high-bandwidth traffic to wait to use the same physical interface adapter as the low-bandwidth traffic, this process results in low throughput if the adapter is slow, or low utilization if the adapter is fast. Network administrators would prefer to have the more voluminous FTP traffic fully utilize a higher-bandwidth (and therefore more expensive) adapter, and have the less voluminous TELNET traffic experience smaller delays over a less highly utilized low-bandwidth adapter, where the lower utilization would matter less because the low-bandwidth adapter is less expensive. Current TCP/IP software limitation do not support traffic splitting, even in the presence of multiple network interface adapters that can reach a common destination. Therefore multiple queues for this purpose, in addition to multiple routes to a common destination are not allowed in the present implementation of TCP/IP. These limitations lead to traffic bottlenecks at the network interface adapters.

RELATED APPLICATIONS

Related applications describing the Virtual IP Addressing (VIPA) technology are:

Application Ser. No. 08/755,420 entitled "Virtual Internet Protocol (IP) Addressing" filed on Nov. 22, 1996 and assigned to IBM Corp., now pending; and, Application Ser. No. 08/761,469 entitled "Host Identity TakeOver Using Virtual Internet Protocol (IP) Addressing" filed on Dec. 6, 1996 also assigned to IBM Corp, now pending.

SUMMARY OF THE INVENTION

The present invention allows the administrator of a host that has multiple network interface adapters to associate each desired subset of applications with a virtual IP address (VIPA) and then configure the host to advertise a route to each such VIPA over a different real physical network interface adapter. This causes traffic for each subset of applications to be transmitted over a different real physical network interface adapter, which the network administrator can select to have bandwidth and delay characteristics that match the application. Therefore, if interactive applications such as TELNET are associated with one VIPA address, and high-bandwidth applications such as FTP are associated with another VIPA, then the voluminous FTP traffic can be segregated to one real physical network interface adapter so that it will not interfere with the interactive response time of the TELNET traffic that is segregated onto a different real physical network interface adapter. Furthermore, this host can be configured such that when a real physical network interface adapter fails, another one can serve as a backup by integrating the different subsets of traffic for the duration of the link failure.

Without significantly increasing the cost of the network, this invention enhances the performance of a TCP/IP network using hosts with multiple or redundant devices or network interface adapters by eliminating the time that one class of application traffic must wait on another class of application traffic for transmission across network interface adapters, while also providing for backup during the failure of one or more real physical network interface adapters. This is accomplished by the use of a virtual device, a virtual adapter, a virtual IP address (VIPA), and Routing Information Protocol (RIP) route forwarding output filters.

DESCRIPTION OF DRAWINGS

In FIGS. 1 through 4 the host is assumed to have one application subset consisting of TELNET and another application subset consisting of FTP; note that there could be more application subsets, and that any application could belong to any application subset.

FIG. 1 depicts a representative network without session traffic splitting.

FIG. 2 demonstrates the logical flow of the transmission process with prior art.

FIG. 3 depicts the representative network with session traffic splitting.

FIG. 4 demonstrates the logical flow of the transmission process with session traffic splitting.

DETAILED DESCRIPTION OF THE PREFERRED EMBODIMENT

Figure 1:
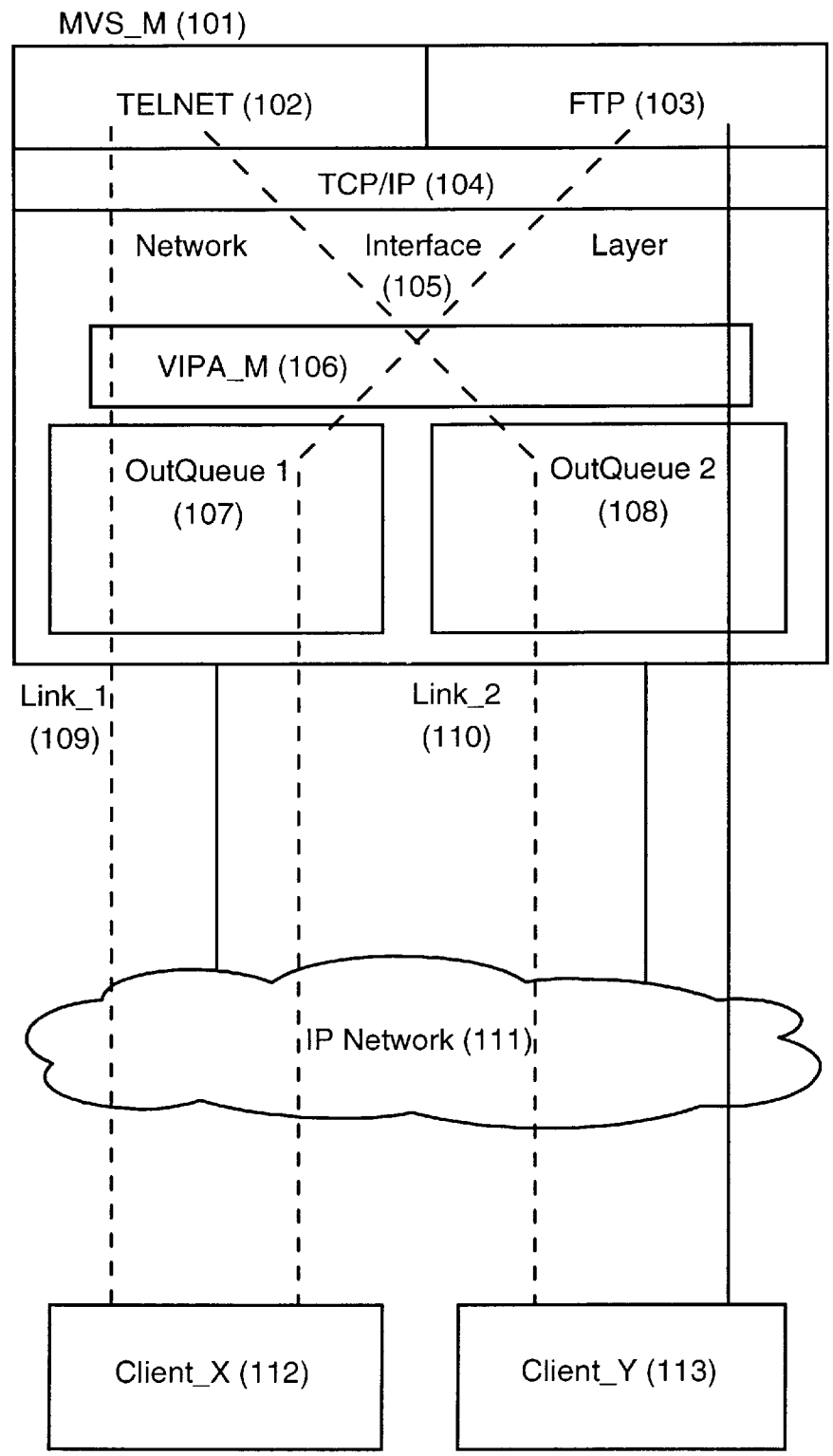

The preferred embodiment of the present invention is implemented in, but not limited to, an IBM MVS (501) host running the TCP/IP protocol and directly connected to a network (503) by two or more links (505) connected to the host through two or more adapters (507). This configuration allows for multiple virtual IP addresses, each of which selects a subset of TCP/IP applications executing on one TCP/IP stack in one host, to proceed without selecting a specific real physical network interface adapter or device. Other hosts that connect to one of the subsets of MVS TCP/IP applications executing on that host can send data to the MVS virtual IP address (VIPA) associated with that subset of applications via whatever paths are selected by the routing protocols. This is enabled by the use of RIP route forwarding filters. Transmission of traffic of one subset of applications between the host and the network will not interfere with transmission of traffic of another subset of applications. Furthermore, should the real physical network interface adapter that is transmitting traffic for a certain subset of applications fail, one of the other real physical network interface adapters can transmit the traffic in a backup mode, although during the outage traffic from different subsets of applications may be mixed. This is explained more completely by way of example in FIGS. 1 and 3.

The means of accomplishing this application categorization and VIPA association is to modify the configuration files of the host's TCP/IP software such that a route to a single VIPA address associated with a desired subset of applications is advertised by RIP (the TCP/IP Routing Information Protocol) only through a real physical network interface adapter specified in the configuration files. To segregate traffic of different subsets of applications, a different VIPA address is associated with each different subset of applications, and RIP is configured to advertise a route to each different VIPA over a different real physical network interface adapter. Furthermore, the host administrator can specify in the configuration files that if a link fails, traffic from the subset of applications that were using that link can share a real physical network interface adapter with traffic from another subset of applications for the duration of the failure. RIP is configured to perform these functions through the Route Forwarding (Conditional and Unconditional) options which provide route forwarding support as a means to filter routes to a particular interface. This can be useful in selecting certain routes to be broadcast over certain interfaces. Two options have been added to support conditional and unconditional route forwarding. With unconditional route forwarding, RIP will not forward routes to other interfaces in case of interface outages. With conditional route forwarding, a forwarded route is allowed to be broadcast over other interfaces throughout the duration of an allowed interface outage. After the failed interface returns to normal, RIP will resume route forwarding to the assigned interface.

FIG. 1 is a representative example of a network that does not use session traffic splitting while still implementing Virtual IP Addressing (VIPA). Host MVS_M (101) has VIPA address VIPA_M (106) by which all clients address host MVS_M. Host MVS_M is executing two applications, TELNET (102) and File Transfer Protocol (FTP) (103), both of which are running on the same TCP/IP stack (104). The TCP/IP stack uses the Network Interface Layer (105) to transmit datagrams to and from the IP Network (111). Within the Network Interface Layer the output queue OutQueue1 (107) holds datagrams ready for transmission across Link_1 (109), and the output queue OutQueue2 (108) holds datagrams ready for transmission across Link_2 (110). Both Link_1 and Link_2 connect to the IP Network. In this ex ample Client_X (112) has connections to both TELNET and FTP via Link_1, and Client_Y (113) has connections to both TELNET and FTP via Link_2. In both OutQueue1 and OutQueue2 Telnet datagrams may be waiting for transmission behind several FTP datagrams.

FIG. 2 demonstrates the process by which the prior art determines routes between MVS_M and the clients Client_X and Client_Y such that each output queue contains datagrams from both TELNET and FTP. In this example, RIP will advertise routes to VIPA_M over both Link_1 and Link_2 (201). In the present example, we assume that (ignoring service levels) the best route between VIPA_M and Client_X traverses Link_1, and that the best route between VIPA_M and Client_Y traverses Link_2. Therefore, after RIP has converged the routing tables throughout the IP network (202), datagrams from VIPA_M to Client_X will pass through Link_1 and therefore through OutQueue1 (203). Likewise, datagrams from VIPA_M to Client_Y will pass through Link_2 and therefore through OutQueue2 (204). Thus, while FTP is sending large files, the relatively small and infrequent TELNET datagrams will be enqueued behind FTP datagrams in both output queues, and therefore transmission of FTP datagrams will impact interactive response times of TELNET users (205).

Figure 3:
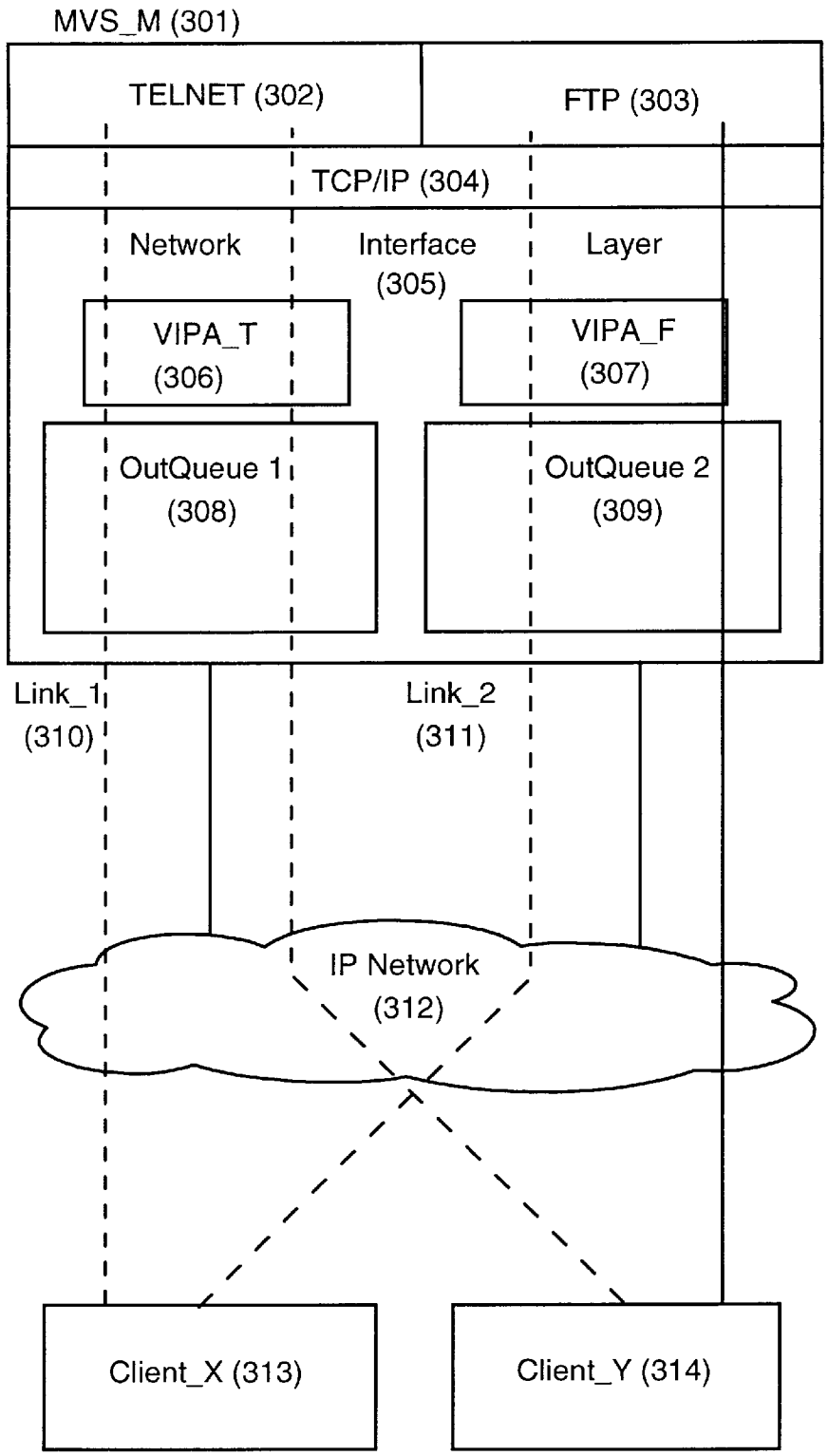

FIG. 3 is a representative example of a network that uses session traffic splitting of the present invention. Host MVS_M (301) is executing two applications, TELNET (302) and File Transfer Protocol (303), both of which are running on the same TCP/IP stack (304). The TCP/IP stack uses the Network Interface Layer (305) to transmit datagrams to and from the IP Network (312). Within the Network Interface Layer the output queue OutQueue1 (308) holds datagrams ready for transmission across Link__1 (310), and the output queue OutQueue2 (309) holds datagrams ready for transmission across Link__2 (311). Both Link__1 and Link__2 connect to the IP__Network. Host MVS__M has two VIPA addresses: VIPA__T (306), which is associated with TELNET, and VIPA__F (307), which is associated with FTP. In this example MVS__M has TELNET connections with both Client__X (313) and Client__Y (314) via Link 1, and MVS__M has FTP connections with both Client__X and Client__Y via Link__2. OutQueue1 contains only TELNET datagrams, and OutQueue2 contains only FTP datagrams. The TELNET datagrams, which are destined to be transmitted across Link__1, need not wait for the transmission of FTP datagrams across Link__2.

Figure 4:
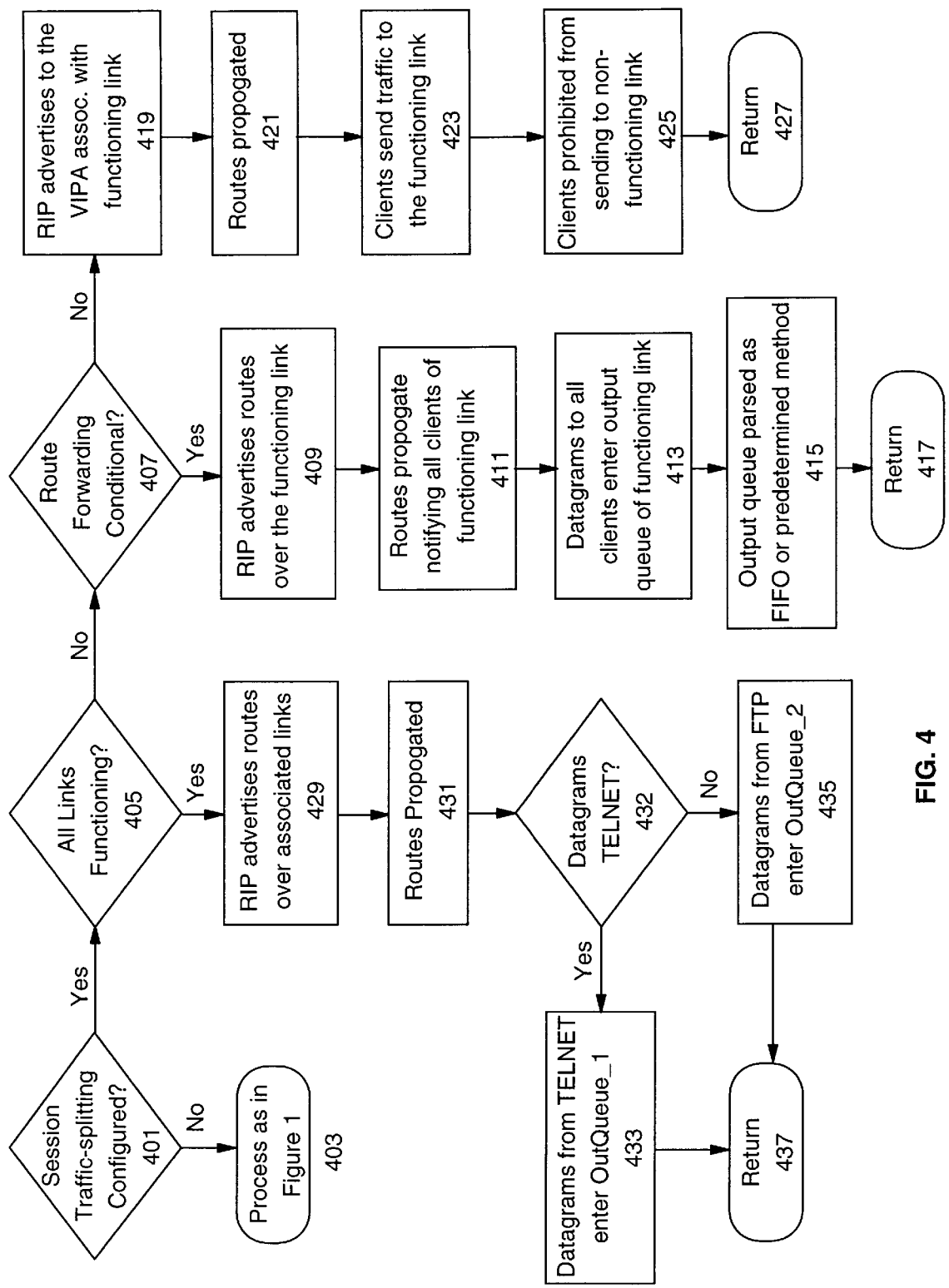
Figure 5:
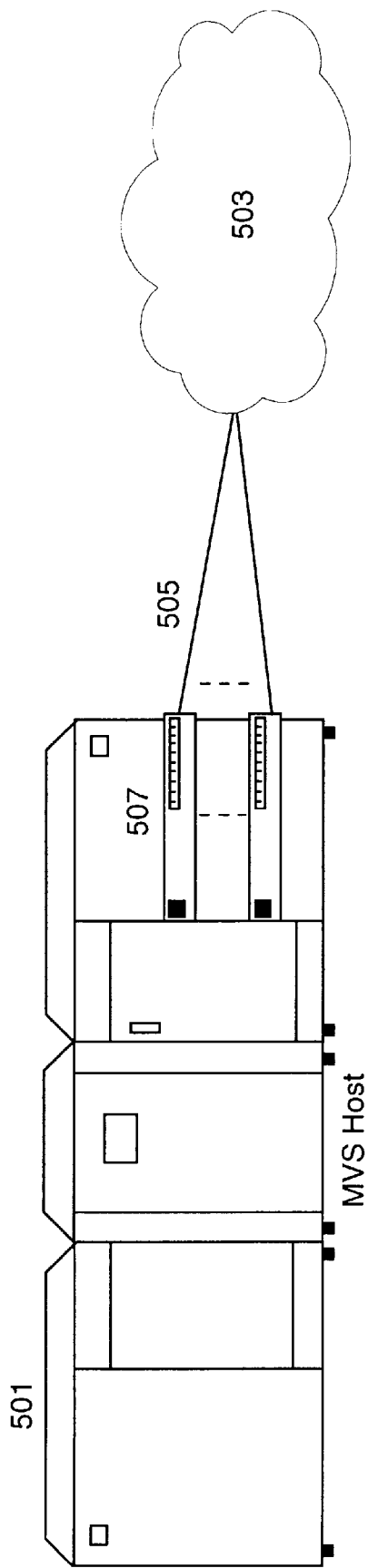
FIG. 5 shows a representative network in which the present invention may be implemented.

FIG. 4 demonstrates the process by which this invention segregates all the TELNET datagrams in one output queue such that they are never queued behind FTP datagrams for transmission, which this invention segregates in another output queue. First, this process checks to determine if the administrator has configured session traffic splitting in the host by setting the RIP route forwarding output filter option (401). If not, the processing continues as in FIG. 1 without session traffic splitting (403). If session traffic splitting is configured, then a check is made to determine whether or not all the links are functioning (405). The different types of links are not limited to just terrestrial and satellite, but all imaginable forms of terrestrial and non-terrestrial links. If not, then the process checks whether or not the RIP route forwarding output filter option is conditional (407).

If conditional route forwarding is configured and some links are not functioning, then RIP in MVS__M will advertise over the functioning link routes to both VIPA__F and VIPA__T (409). Therefore, after RIP has converged the routing tables throughout the IP network, datagrams from both FTP and TELNET in MVS__M to any client will pass through the functioning link (411) and therefore through its output queue (413). This results in both the FTP and TELNET datagrams being placed into the same queue. Thus, while FTP is sending large files, the relatively small and infrequent TELNET datagrams will be enqueued behind FTP datagrams in that output queue, and therefore transmission of FTP datagrams will impact interactive response times of TELNET users (415) if the method for parsing the output queue is FIFO, as it is in most TCP/IP implementations. The process is then continued as before (417).

If unconditional route forwarding is configured and some links are not functioning, then RIP in MVS__M will advertise over the functioning link routes to only the VIPA associated with the functioning link (419). Therefore, the routes propagate through the IP network such that, after RIP has converged the routing tables throughout the IP network, all clients send traffic to the VIPA associated with the desired application via the functioning link (421). Datagrams of the application bound to the VIPA associated with the functioning link will pass through the functioning link (423). Furthermore, after RIP has converged the routing tables throughout the IP network, datagrams of the application bound to the VIPA associated with the non-functioning link cannot be delivered (425). From this point, processing continues as before (427).

If the administrator has configured the RIP route forwarding output filter option, and all links are functioning then RIP in MVS__M will advertise routes over their associated links (429). In the present example, MVS__M will advertise routes to VIPA__T only over Link__1 and routes to VIPA__F only over Link__2 (431). Therefore, after RIP has converged the routing tables throughout the IP network all clients will send to the target applications via their associated link. In our particular example, a determination will be made as to whether or not the datagrams are TELNET datagrams (432). If the datagrams are from TELNET in MVS__M they will pass through Link__1 regardless of the associated client and therefore through OutQueue1 (433). Likewise, any datagrams not from TELNET, in our example, are FTP datagrams, whereby datagrams from FTP in MVS__M to any client will pass through Link__2 and therefore through OutQueue2 (435). Thus, even while FTP is sending large files, the relatively small and infrequent TELNET datagrams will not be enqueued behind FTP datagrams in the output queues, and therefore transmission of FTP datagrams will not impact interactive response times of TELNET users. From this point on the process continues as before (437).

What is claimed is:

1. A communications network comprising:

a host computer executing communications applications;

two or more communications interface adapters associated with said host computer;

one communications link attached to each of said two or more communications interface adapters connecting said host computer to a TCP/IP network;

a Virtual Internet Protocol Address (VIPA) associated with each of said communications interface adapters;

an output queue associated with each of said communications links and a corresponding one of the VIPAs; and, two or more categories of communications applications executing on said host computer such that each VIPA is associated with one or more of said categories of communications applications wherein applications in a category communicate with said TCP/IP network over said communications interface adapter associated with said category of applications utilizing the associated one of the output queues by directing information to said associated VIPA such that communications of different categories utilize different ones of the output queues and corresponding communications links irrespective of a destination Internet Protocol (IP) address of a destination device.

2. A network as claimed in claim 1 wherein:

at least one of said communications links is a terrestrial link and at least one of said communications links is a satellite link.

3. A network as claimed in claim 1 wherein:

at least one category of communications applications is for file transfer and at least one or more categories of communications applications is for interactive traffic.

4. A method of connecting a host computer to a TCP/IP network, said host computer having two or more communications interface adapters, each communications interface adapter attached to one communication link and executing two or more applications, said method comprising the steps of:

defining a virtual Internet protocol (IP) address associated with each of said communications interface adapters;

programmatically categorizing each of said applications programs into distinct categories;

programmatically associating each of said distinct categories of applications programs with a virtual IP address; and, sending information from any of said applications programs over said TCP/IP network by indicating said associated virtual IP address and utilizing said associated communications interface adapter irrespective of a destination address associated with the information.

5. A method as claimed in claim 4 wherein at least one of said communications links is a terrestrial link and at least one of said communications links is a satellite link.

6. A method as claimed in claim 4 wherein:

at least one category of communications applications is for file transfer and at least one or more categories of communications applications is for interactive traffic.

7. A programmable media for transferring information to a host computer, said programmable media containing a programmably implemented method of connecting a host computer to a TCP/IP network, said host computer having two or more communications interface adapters, each communications interface adapter attached to one communications link and executing two or more applications, said method comprising the steps of:

defining a virtual internet protocol (IP) address associated with each of said communications interface adapters;

programmatically categorizing each of said applications programs into distinct categories;

programmatically associating each of said distinct categories of applications programs with a virtual IP address; and, sending information from any of said applications programs over said TCP/IP network by indicating said associated virtual IP address and utilizing said associated communications interface adapter irrespective of a destination address associated with the information.

* * * * *